US011418080B2

(12) United States Patent
Tsutsui

(10) Patent No.: US 11,418,080 B2
(45) Date of Patent: Aug. 16, 2022

(54) ROTARY ELECTRIC MACHINE

(71) Applicant: HONDA MOTOR CO., LTD., Tokyo (JP)

(72) Inventor: Takahiro Tsutsui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 16/900,338

(22) Filed: Jun. 12, 2020

(65) Prior Publication Data
US 2020/0395802 A1    Dec. 17, 2020

(30) Foreign Application Priority Data

Jun. 12, 2019  (JP) .............................. JP2019-109795

(51) Int. Cl.
*H02K 3/24*   (2006.01)
(52) U.S. Cl.
CPC ...................................... *H02K 3/24* (2013.01)
(58) Field of Classification Search
CPC .......... H02K 3/522; H02K 3/24; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 5/20; H02K 1/20; H02K 1/32
USPC ...... 310/61, 58, 57, 59, 60, 89, 63, 62, 194, 310/54, 214, 43, 65, 60 A
See application file for complete search history.

(56) References Cited

U.S. PATENT DOCUMENTS

| | | | | |
|---|---|---|---|---|
| 2,074,067 A | * | 3/1937 | Darnell | H02K 9/06 310/52 |
| 3,610,975 A | * | 10/1971 | Onjanow | H02K 9/18 416/93 R |
| 3,761,748 A | * | 9/1973 | Baumann | H02K 9/06 310/58 |
| 4,492,885 A | * | 1/1985 | Kitamura | H02K 9/06 310/63 |
| 5,258,679 A | * | 11/1993 | Gassmann | H02K 11/33 310/194 |
| 6,066,905 A | * | 5/2000 | Wright | H02K 3/20 310/260 |

(Continued)

FOREIGN PATENT DOCUMENTS

JP       2009-273284 A     11/2009
JP       2009273284 A   *  11/2009

*Primary Examiner* — Maged M Almawri
(74) *Attorney, Agent, or Firm* — Paratus Law Group, PLLC

(57) ABSTRACT

A rotary electric machine includes a rotor having a rotor core, an end plate disposed on a rotor core end surface, and a stator including a stator core disposed at a gap from the rotor, and a coil provided to the stator core. The stator core includes a stator yoke portion having a substantially annular shape, stator teeth portions provided along a circumferential direction and protruding radially from the stator yoke portion, and slot portions formed between adjacent stator teeth portions. The coil is inserted into each slot portion of the stator core and includes a coil end portion protruding in an axial direction from a stator core end surface. A refrigerant is discharged radially outward of the rotor. A refrigerant guide unit for guiding the refrigerant discharged radially outward in a protruding direction of the coil end portion is disposed on the stator core end surface.

9 Claims, 8 Drawing Sheets

(56) References Cited

U.S. PATENT DOCUMENTS

| | | | |
|---|---|---|---|
| 6,188,153 B1* | 2/2001 | Hokanson | H02K 9/00 310/58 |
| 6,570,284 B1* | 5/2003 | Agnes | H02K 1/185 310/156.01 |
| 6,658,721 B2* | 12/2003 | Kazama | H02K 15/02 310/216.008 |
| 6,700,235 B1* | 3/2004 | McAfee | H02K 9/06 310/58 |
| 6,784,586 B2* | 8/2004 | Akemakou | H02K 11/048 310/194 |
| 7,538,467 B2* | 5/2009 | Engquist | H02K 1/148 310/216.067 |
| 8,013,490 B2* | 9/2011 | Hino | H02K 3/522 310/194 |
| 8,179,015 B2* | 5/2012 | Nishikawa | H02K 21/044 310/263 |
| 8,203,240 B2* | 6/2012 | Hoshino | B60L 1/02 310/214 |
| 8,253,299 B1* | 8/2012 | Rittenhouse | B62M 6/65 310/257 |
| 8,896,167 B2* | 11/2014 | McKinzie | H02K 1/32 310/60 A |
| 2002/0149273 A1* | 10/2002 | Soitu | H02K 1/32 310/58 |
| 2004/0155550 A1* | 8/2004 | Yamamoto | H02K 13/04 310/194 |
| 2004/0222715 A1* | 11/2004 | Yamamura | H02K 15/095 310/216.015 |
| 2006/0244326 A1* | 11/2006 | Tamaoka | F16F 15/023 310/90 |
| 2007/0024129 A1* | 2/2007 | Pfannschmidt | H02K 1/20 310/59 |
| 2009/0184591 A1* | 7/2009 | Hoshino | B60L 7/14 310/60 A |
| 2014/0042841 A1* | 2/2014 | Rippel | H02K 9/19 310/54 |
| 2014/0054987 A1* | 2/2014 | Miyamoto | H02K 9/19 310/54 |
| 2015/0028727 A1* | 1/2015 | Watanabe | H02K 9/06 310/60 A |
| 2019/0006914 A1* | 1/2019 | Graves | F16H 57/046 |

* cited by examiner

ROTARY ELECTRIC MACHINE

CROSS-REFERENCE TO RELATED APPLICATIONS

The present application claims the benefit of priority of Japanese Patent Application No. 2019-109795, filed on Jun. 12, 2019, the content of which is incorporated herein by reference.

TECHNICAL FIELD

The present invention relates to a rotary electric machine, and more particularly, to a rotary electric machine which cools a coil of a stator with a refrigerant.

BACKGROUND

The rotary electric machine causes losses such as copper loss, core loss, and mechanical loss as it is driven, and generates heat due to those losses. When the rotary electric machine becomes excessively heated due to such heat generation, the output performance may degrade, and further parts may deteriorate or the permanent magnet may be demagnetized. Therefore, in recent years, there has been known a technique of supplying a liquid serving as a refrigerant, for example, a cooling liquid such as ATF, to a coil end portion protruding axially outward from the stator core in order to cool a coil of a stator.

For example, JP-A-2009-273284 discloses a rotary electric machine where a refrigerant flowing inside a rotating shaft is introduced into a refrigerant flow passage formed between an end plate and a stator core and is discharged from the refrigerant flow passage toward a coil end portion of a coil of a stator such that the refrigerant is supplied to the coil end portion to cool the coil of the stator.

In this rotary electric machine, although the refrigerant is supplied to an inner peripheral portion of the coil end portion, the refrigerant is not supplied to an outer peripheral portion of the coil end portion. Therefore, the outer peripheral portion of the coil end portion tends to be not cooled, and thus it is difficult to cool the coil end portion uniformly.

SUMMARY

Accordingly, an aspect of the present invention provides a rotary electric machine capable of uniformly cooling a coil end portion.

According to an embodiment of the present invention, there is provided a rotary electric machine comprising:
a rotor including a rotor core having a substantially annular shape;
an end plate disposed on a first rotor core end surface on at least one end side of the rotor core in an axial direction; and
a stator including a stator core disposed at a predetermined gap from an outer peripheral surface of the rotor, and a coil provided to the stator core,
wherein the stator core includes:
a stator yoke portion having a substantially annular shape;
a plurality of stator teeth portions provided along a circumferential direction and protruding radially from an inner peripheral surface of the stator yoke portion toward a center; and
a plurality of slot portions formed between adjacent stator teeth portions,
wherein the coil inserted into each slot portion of the stator core and includes a coil end portion protruding in the axial direction from a first stator core end surface on the one end side of the stator core in the axial direction,
wherein a refrigerant is discharged radially outward of the rotor, and
wherein a refrigerant guide unit configured to guide the refrigerant discharged radially outward of the rotor in a protruding direction of the coil end portion is disposed on the first stator core end surface.

According to the above configuration, the refrigerant discharged radially outward of the rotor can be guided from the first stator core end surface in the protruding direction of the coil end portion by the refrigerant guide unit disposed on the first stator core end surface. Therefore, the coil end portion can be cooled uniformly.

DESCRIPTION OF EMBODIMENTS

Hereinafter, a rotary electric machine according to embodiments of the present invention will be described with reference to the accompanying drawings.

First Embodiment

First, a rotary electric machine according to a first embodiment of the present invention will be described with reference to FIGS. 1 to 6.

Overall Configuration of Rotary Electric Machine

Figure 1:
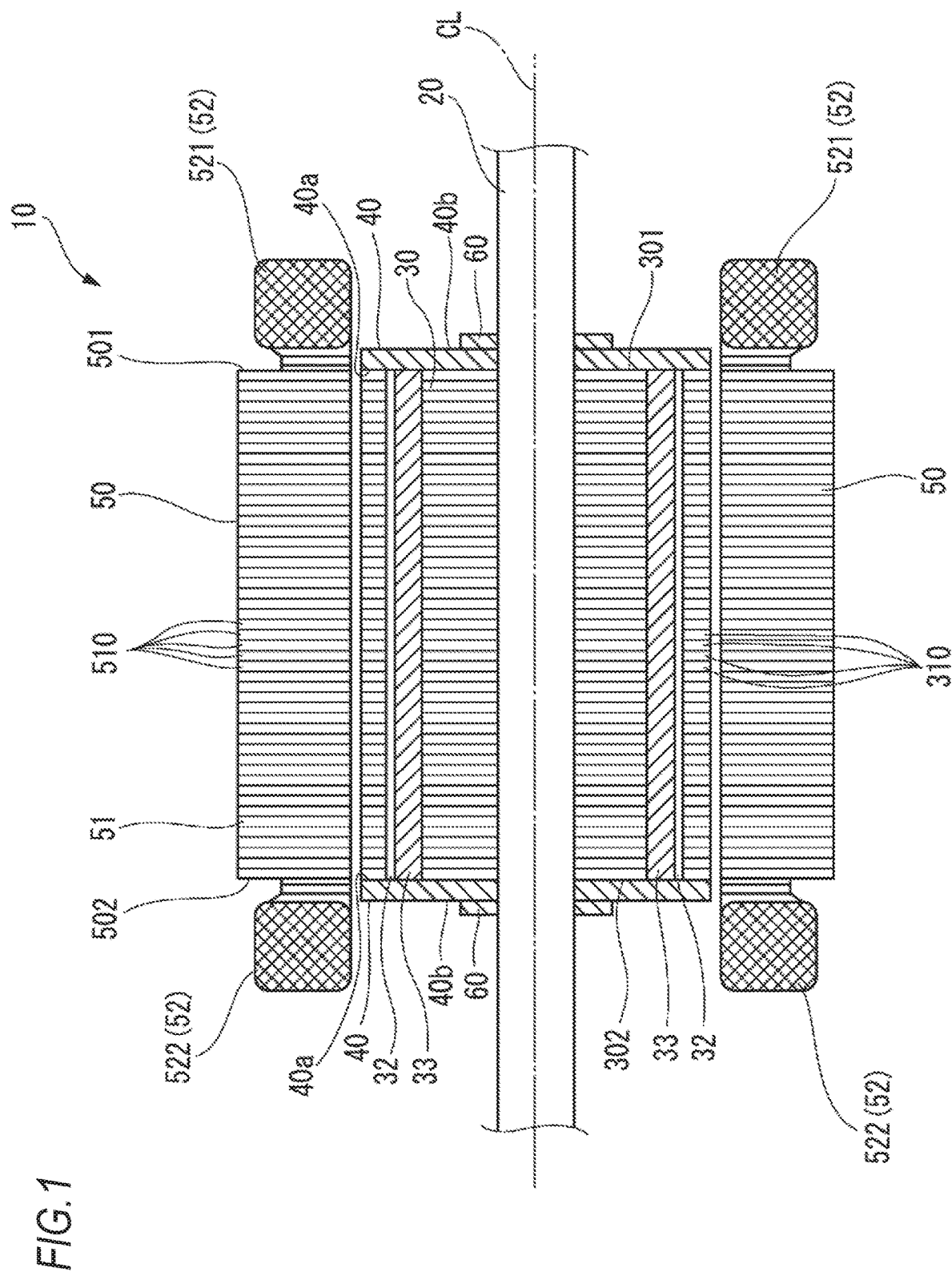
FIG. 1 is a diagram schematically illustrating an overall configuration of a rotary electric machine according to a first embodiment of the present invention.

As illustrated in FIG. 1, a rotary electric machine 10 of the embodiment includes a rotating shaft 20, a substantially annular rotor 30 fixed to an outer peripheral surface of the rotating shaft 20, a pair of end plates 40 disposed on both axial end surfaces of the rotor 30, and a stator 50 disposed to face the outer peripheral surface of the rotor 30.

In this specification, for simplicity and clarity of description, the terms "axial direction", "radial direction", and "circumferential direction" refer to directions based on a rotation axis CL of the rotating shaft 20. The term "inside in the axial direction" refers to a center side of the rotor 30 and the stator 50 in the axial direction, and the term "outside in the axial direction" refers to a side away from the center of the rotor 30 and the stator 50.

When the rotary electric machine 10 operates as a motor, the rotating shaft 20 outputs the rotating power of the rotary electric machine 10 to the outside as an output shaft of the rotary electric machine 10. When the rotary electric machine 10 operates as a generator, the rotating shaft 20 inputs external rotating power to the rotary electric machine 10 as an input shaft of the rotary electric machine 10.

The rotor 30 has a substantially annular shape. The rotor 30 includes a rotor core 31 in which a plurality of magnet insertion holes 32 parallel to the rotation axis CL of the rotation shaft 20 are provided on an outer peripheral side along the circumferential direction and a plurality of permanent magnets 33 inserted into the respective magnet insertion holes 32.

The rotor core 31 includes a plurality of substantially annular electromagnetic steel plates 310 laminated in the axial direction. The rotor core 31 includes a first end surface 301 and a second end surface 302 at both ends in the axial direction.

Each of the pair of end plates 40 has a substantially annular shape whose outer peripheral surface is substantially the same as the outer peripheral surface of the rotor core 31 when viewed from the axial direction. The end plate 40 has an axial inner end surface 40*a* and an axial outer end surface 40*b*. The axial inner end surfaces 40*a* of the pair of end plates 40 both face the rotor 30 in the axial direction. Collars 60 are respectively in contact with the axial outer end surfaces 40*b* of the pair of end plates 40.

The collar 60 has an annular shape smaller in diameter than the end plate 40 and is fixed to the outer peripheral surface of the rotating shaft 20. The rotor 30 and the pair of end plates 40 are sandwiched in the axial direction by the pair of collars 60 and are fixed to the rotating shaft 20 in the axial direction.

The stator 50 includes a stator core 51 having a substantially annular shape and a coil 52 provided to the stator core 51 and includes a plurality of windings of U-phase, V-phase and W-phase.

The stator core 51 includes a plurality of substantially annular electromagnetic steel plates 510 laminated in the axial direction.

The coil 52 includes a first coil end portion 521 protruding in the axial direction from the first end surface 501 of the stator core 51 in the axial direction and a second coil end portion 522 axially protruding from the second end surface 502 of the stator core 51 in the axial direction.

Figure 2A:
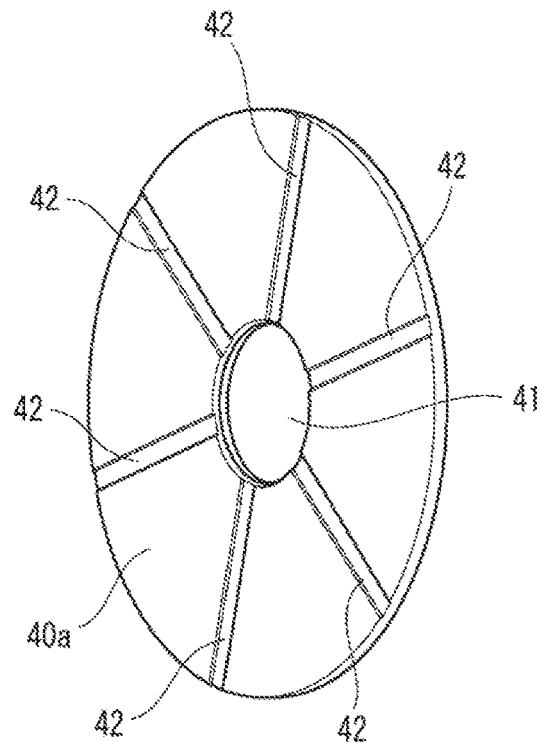
FIG. 2A is a perspective view of an end plate of the rotary electric machine of FIG. 1.

As illustrated in FIG. 2A, the end plate 40 has a substantially annular shape in which a rotating shaft insertion hole 41 is formed at the center. A plurality (six in the embodiment) of refrigerant flow grooves 42 are formed on the axial inner end surface 40*a* of the end plate 40 in the circumferential direction and extend radially from the rotation shaft insertion hole 41 toward the outer peripheral surface of the end plate 40.

Figure 2B:
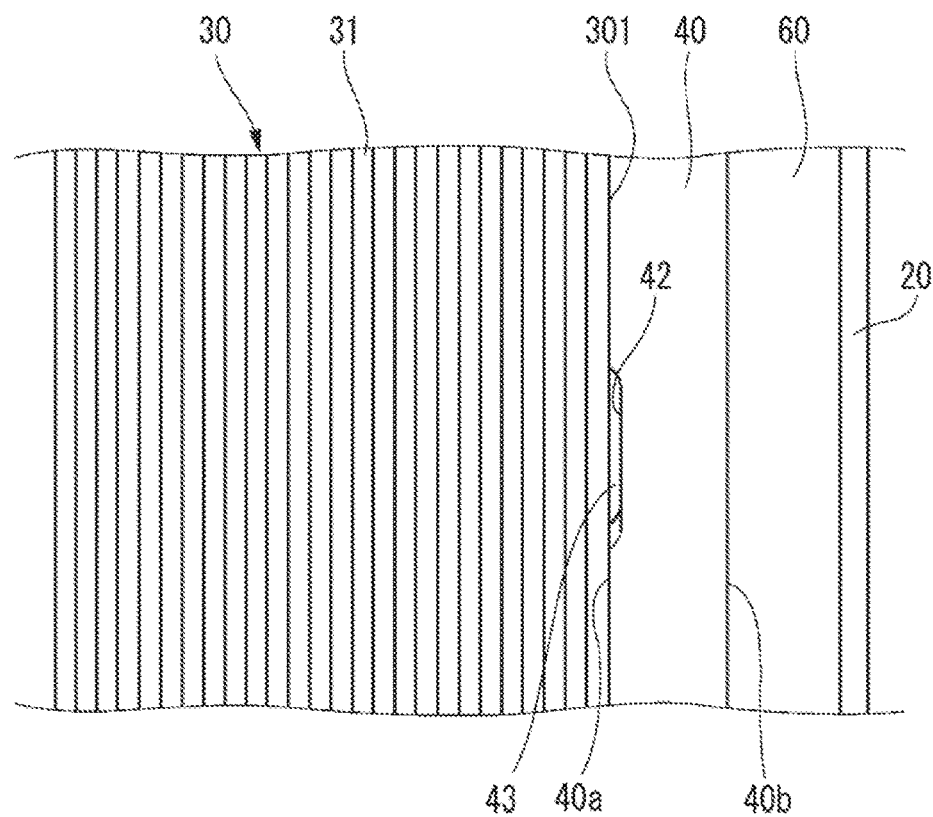
FIG. 2B is a partial enlarged view of the end plate of FIG. 2A as viewed from a radial outside in a state where the end plate is assembled to the rotary electric machine.

As illustrated in FIG. 2B, the axial inner end surface 40*a* of the end plate 40 disposed on the first end surface 301 of the rotor core 31 is in contact with the first end surface 301 of the rotor core 31. A refrigerant supply passage 43 is formed by a space surrounded by the refrigerant flow groove 42 of the end plate 40 and the first end surface 301 of the rotor core 31.

Figure 3:
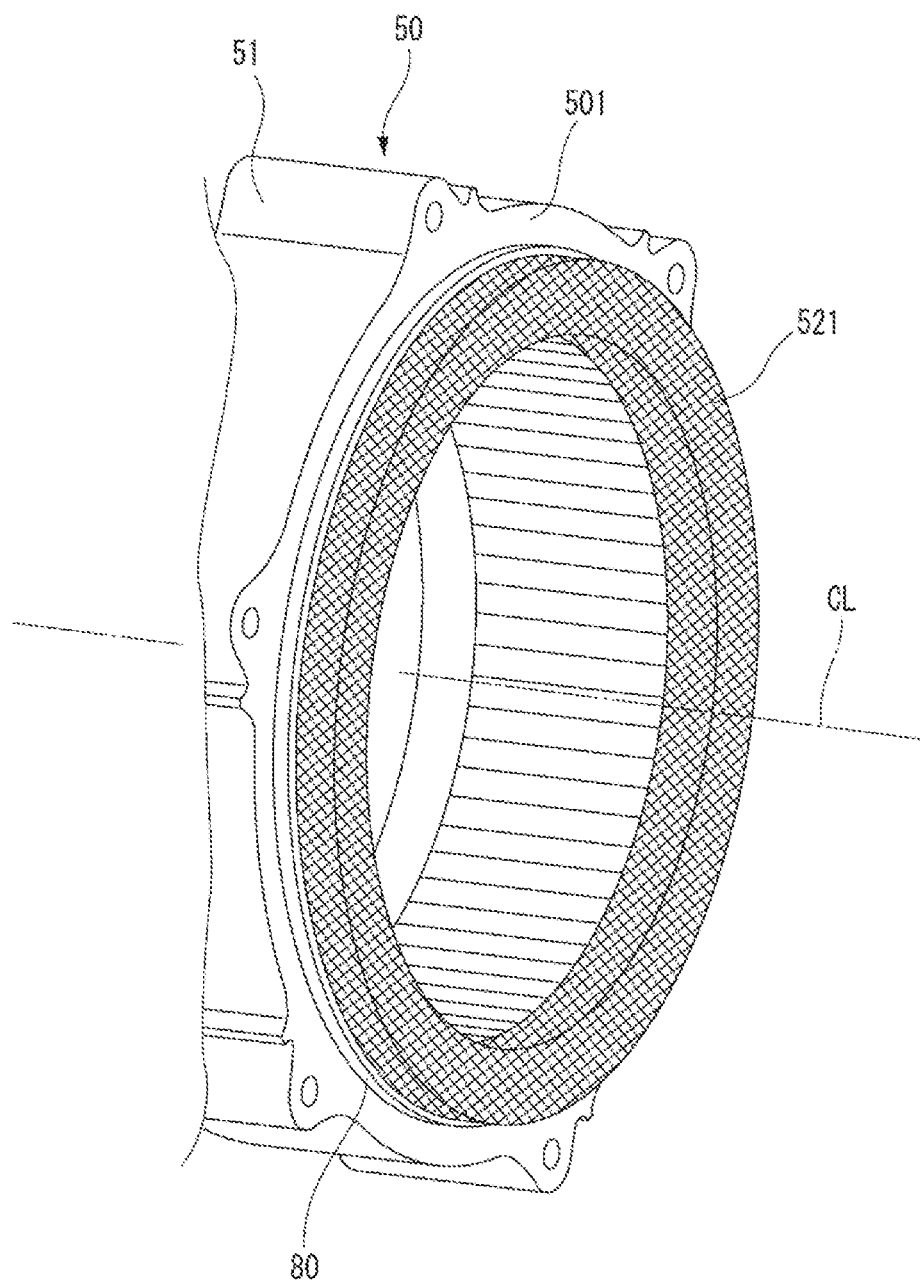
FIG. 3 is a perspective view of a stator of the rotary electric machine of FIG. 1 in a state where a refrigerant guide unit is assembled.

As illustrated in FIG. 3, a refrigerant guide unit 80 is disposed on the first end surface 501 of the stator core 51 in the axial direction along the first coil end portion 521 in the circumferential direction.

Figure 4A:
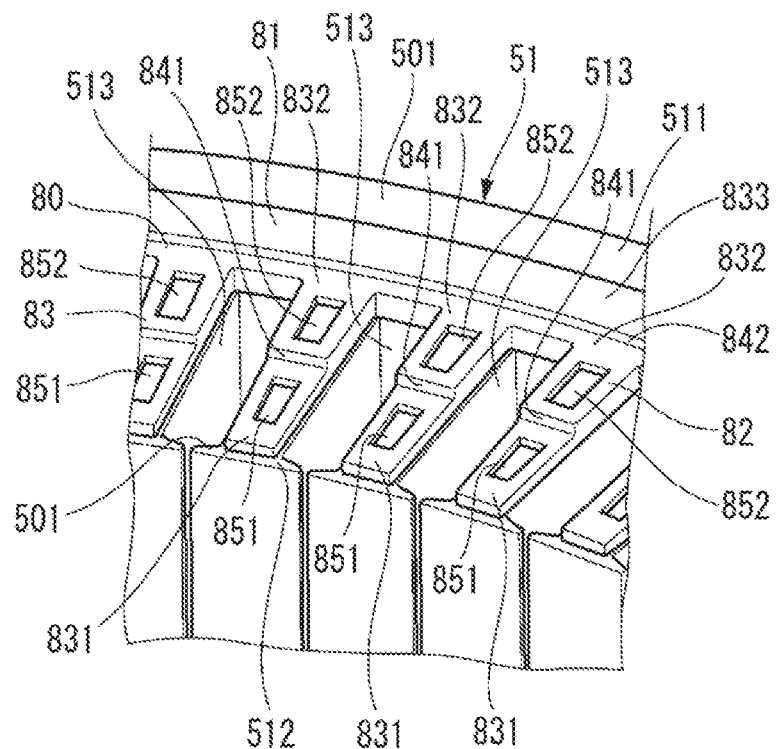
FIG. 4A is a partial enlarged view of the stator and the refrigerant guide unit of the rotary electric machine of FIG. 1 as viewed obliquely in a state where a coil is removed.

As illustrated in FIG. 4A, the stator core 51 includes a substantially annular stator yoke portion 511 and a plurality of stator teeth portions 512 protruding radially from the inner peripheral surface of the stator yoke portion toward the center. The plurality of stator teeth portions 512 are arranged at equal intervals along the circumferential direction of the stator core 51. Each slot portion 513 is formed between the stator teeth portions 512 adjacent each other in the circumferential direction of the stator core 51. A plurality of slot portions 513 are formed at equal intervals along the circumferential direction of the stator core 51. Each stator teeth portion 512 and each slot portion 513 extend along the axial direction of the stator core 51.

The refrigerant guide unit 80 disposed on the first end surface 501 of the stator core 51 is a resin molded member formed of an insulating material, for example, epoxy resin. The refrigerant guide unit 80 includes a substantially annular cuff ring portion 81 in contact with the stator yoke portion 511 of the first end surface 501 of the stator core 51 and a cuff teeth portion 82 which protrudes from the inner peripheral surface of the cuff ring portion 81 toward the center in a radial direction at a position corresponding to the stator teeth portion 512 of the stator core 51 and is disposed on the stator teeth portion 512 of the first end surface 501 of the stator core 51. The cuff teeth portions 82 are formed such that the circumferential width thereof is substantially the same as the circumferential width of the stator teeth portion 512.

The axial outer end surface 83 of the refrigerant guide unit 80 includes a first refrigerant guide surface 831 extending radially outward from the inner peripheral surface of the refrigerant guide unit 80, a second refrigerant guide surface 832 extending radially from the radial outer side of the first refrigerant guide surface 831, and a third refrigerant guide surface 833 extending radially from the radial outer side of the second refrigerant guide surface 832 to the outer circumferential surface of the refrigerant guide unit 80.

The second refrigerant guide surface 832 is formed outside the first refrigerant guide surface 831 in the axial direction and a first step portion 841 extending in the axial direction is formed between the first refrigerant guide surface 831 and the second refrigerant guide surface 832. Further, the third refrigerant guide surface 833 is formed outside the second refrigerant guide surface 832 in the axial direction and a second step portion 842 extending in the axial direction is formed between the second refrigerant guide surface 832 and the third refrigerant guide surface 833.

In the embodiment, the first refrigerant guide surface 831 and the second refrigerant guide surface 832 are formed such that the first step portion 841 is disposed substantially at the center of the cuff teeth portion 82 in the radial direction and the second refrigerant guide surface 832 and the third refrigerant guide surface 833 are formed such that second step portion 842 is disposed in the cuff ring portion 81. Each of the first step portions 841 formed in each of the cuff teeth portion 82 is formed so as to be substantially at the same position in the radial direction. The second step portion 842 is formed to have a substantially circular shape around the rotation axis CL of the rotating shaft 20 over the entire circumference of the cuff ring portion 81 when viewed from the axial direction.

Further, the refrigerant guide unit 80 includes a first through-hole 851 which penetrates in the axial direction from the first refrigerant guide surface 831 and through which the first end surface 501 of the stator core 51 is exposed, and a second through-hole 852 which penetrates in the axial direction from the second refrigerant guide surface 832 and through which the first end surface 501 of the stator core 51 is exposed.

In the embodiment, both the first through-hole 851 and the second through-hole 852 are arranged at positions, through which the first end surface 501 of the stator teeth portion 512 of the stator core 51 is exposed.

Figure 4B:
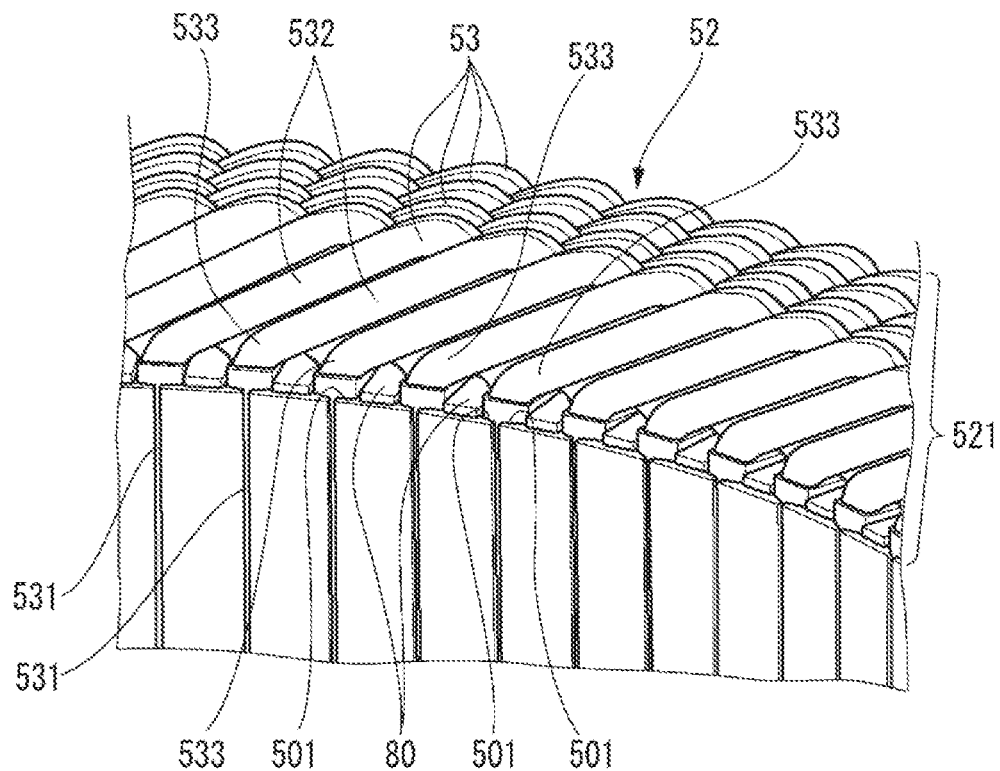
FIG. 4B is a partial enlarged view of the stator and the refrigerant guide unit of the rotary electric machine of FIG. 1 as viewed obliquely in a state where the coil is attached.

As illustrated in FIG. 4B, the coil 52 includes a plurality of conductor segments 53 inserted in all the slot portions 513 of the stator core 51 in the circumferential direction. The conductor segments 53 are inserted into all slot portions 513 of the stator core 51.

The conductor segment 53 is substantially U-shaped and includes two linear leg portions 531 inserted into different slot portions 513 of the stator core 51 and a curved portion 532 connecting the two leg portions 531.

The conductor segment 53 is disposed such that the curved portion 532 protrudes outward in the axial direction from the first end surface 501 of the stator core 51 and the leg portion 531 is inserted into the slot portion 513 of the stator core 51. Then, the leg portion 531 protrudes axially outward from the second end surface 502 of the stator core 51. The leg portion 531 of a portion which protrudes axially outward from the second end surface 502 of the stator core 51 is bent in the circumferential direction and welded to the leg portion 531 of the other conductor segment 53. Accordingly, the conductor segment 53 forms the coil 52 which passes through the slot portion 513 of the stator core 51 and is wound around the stator teeth portion 512 of the stator core 51.

The first coil end portion 521 protruding in the axial direction from the first end surface 501 of the stator core 51 in the axial direction is formed by the curved portion 532 of the conductor segment 53 protruding axially outward from the first end surface 501 of the stator core 51. The second coil end portion 522 protruding in the axial direction from the second end surface 502 of the stator core 51 in the axial direction is formed by the leg portion 531 of the portion which protrudes axially outward from the second end surface 502 of the stator core 51, is bent in the circumferential direction and is welded to the leg 531 of the other conductor segment 53. Both the first coil end portion 521 and the second coil end portion 522 have a substantially annular shape protruding axially outward from the stator core 51.

Here, the cuff teeth portion 82 of the refrigerant guide unit 80 is formed such that the circumferential width is substantially the same as the circumferential width of the stator teeth portion 512. The position of a connection portion 533 between the leg portion 531 of the conductor segment 53 and the curved portion 532 is regulated so as to be located axially outside the cuff teeth portion 82. Therefore, the amount of circumferential bending of the conductor segment 53 in the first coil end portion 521 can be regulated, and the conductor segment 53 can be prevented from coming into contact with the first end surface 501 of the stator core 51. Accordingly, the stator core 51 and the conductor segments 53 forming the coil 52 can be prevented from being damaged.

Further, since the refrigerant guide unit 80 is formed of an insulating material, insulation between the conductor segments 53 forming the coil 52 and the like can be ensured.

Configuration of Refrigerant Passage

Figure 5:
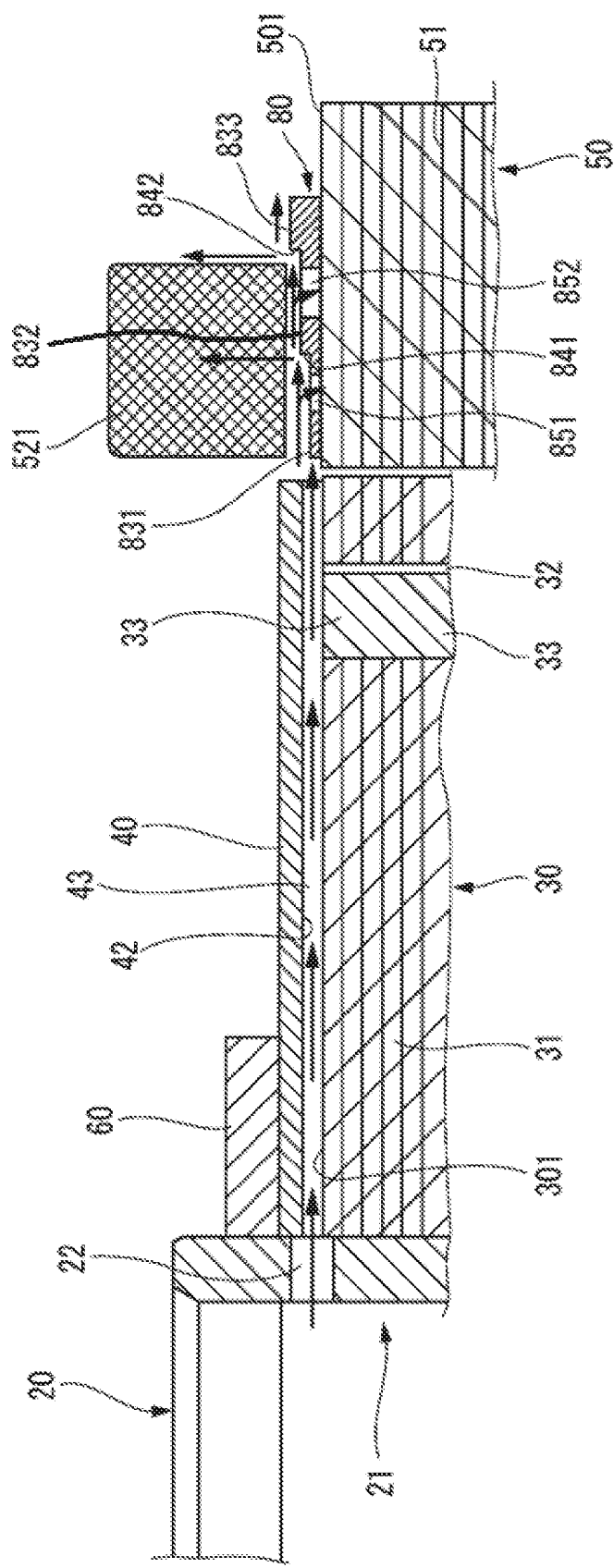
FIG. 5 is a partial cross-sectional view of the rotary electric machine of FIG. 1 as viewed from a circumferential direction.

As illustrated in FIG. 5, the rotating shaft 20 is a hollow member and includes a refrigerant passage 21 through which the refrigerant flows at the center and a refrigerant supply hole 22 which penetrates in the radial direction. The refrigerant supply hole 22 communicates with the refrigerant supply passage 43 (see FIGS. 2A and 2B) formed by a space surrounded by the refrigerant flow groove 42 of the end plate 40 and the first end surface 301 of the rotor core 31.

The refrigerant is pumped by a refrigerant pump (not illustrated) and supplied to a refrigerant passage 21 formed in the rotating shaft 20. The refrigerant supplied to the refrigerant passage 21 is supplied to the refrigerant supply passage 43 through the refrigerant supply hole 22 and is discharged to the outside of the rotor 30 and the end plate 40 in the radial direction through the refrigerant supply passage 43.

That is, the refrigerant flow groove 42 is formed in the end plate 40 for guiding the refrigerant radially outward of the end plate 40, so that the refrigerant supply passage 43 surrounded by the refrigerant flow groove 42 and the first end surface 301 of the rotor 30 can be formed. Accordingly, the refrigerant supplied to the refrigerant passage 21 of the rotating shaft 20 can be supplied more efficiently to the radial outside of the rotor 30 and the end plate 40.

The refrigerant discharged radially outside the rotor 30 and the end plate 40 flows along the first refrigerant guide surface 831 of the refrigerant guide unit 80 and partly flows to the first through-hole 851. Then, the refrigerant flowing to the first through-hole 851 directly comes into contact with the first end surface 501 of the stator core 51, so that the stator core 51 can be directly cooled.

A part of the refrigerant flowing along the first refrigerant guide surface 831 hits the first step portion 841 and spreads outward in the axial direction. Therefore, the refrigerant flowing along the first refrigerant guide surface 831 can be guided from the first end surface 501 of the stator core 51 in a protruding direction of the first coil end portion 521, and thus the first coil end portion 521 can be cooled uniformly.

Since the refrigerant guide unit 80 has the cuff teeth portion 82 disposed on the first end surface 501 of the stator teeth portion 512 of the stator core 51, the refrigerant discharged radially outside the rotor 30 and the end plate 40 and flowing through the first end surface 501 of the stator teeth portion 512 can be guided in the protruding direction of the first coil end portion 521.

Further, the first step portion 841 is arranged at a substantially central position of the cuff teeth portion 82 in the radial direction. Therefore, the refrigerant flowing along the first refrigerant guide surface 831 can be guided in the protruding direction of the first coil end portion 521 by the first step portion 841 at a substantially radial central position of the first coil end portion 521 of the coil 52, and thus the first coil end portion 521 can be cooled more uniformly.

A part of the refrigerant flowing along the first refrigerant guide surface 831 flows along the second refrigerant guide surface 832. A part of the refrigerant flowing along the second refrigerant guide surface 832 flows to the second through-hole 852. Then, the refrigerant flowing to the second through-hole 852 directly comes in contact with the first end surface 501 of the stator core 51, so that the stator core 51 can be directly cooled.

A part of the refrigerant flowing along the second refrigerant guide surface 832 hits the second step portion 842 and spreads outward in the axial direction. Thus, since the refrigerant guide unit 80 includes the first step portion 841 and the second step portion 842 along the radial direction, the refrigerant can be guided more in the protruding direction of the first coil end portion 521. In addition, since the refrigerant can be guided in the protruding direction of the first coil end portion 521 at a plurality of locations of the first step portions 841 and the second step portions 842 along the radial direction, the refrigerant can be spread to a wider area of the first coil end portion 521.

Further, since the second step portion 842 is disposed in the cuff ring portion 81, the refrigerant which hits the second step portion 842 is supplied to the outer peripheral portion of the first coil end portion 521. Accordingly, the refrigerant flowing along the second refrigerant guide surface 832 can be guided to the outer peripheral portion of the first coil end portion 521, and thus the first coil end portion 521 can be cooled more uniformly.

Figure 6:
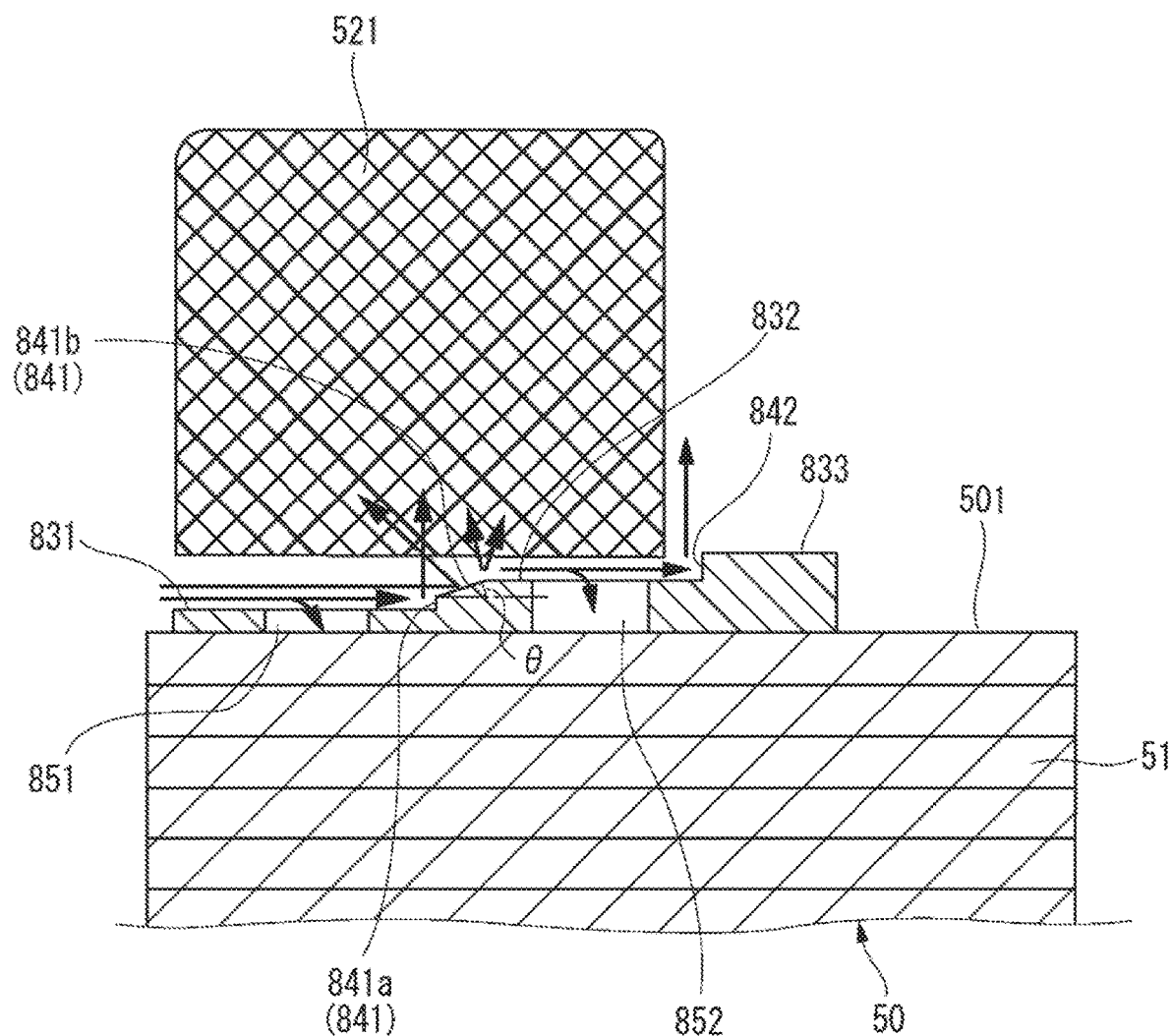
FIG. 6 is an enlarged view of the stator illustrated in FIG. 5 and its vicinity.

As illustrated in FIG. 6, it may be configured such that the first step portion 841 includes a vertical surface 841a extending from the first refrigerant guide surface 831 substantially vertically to the first end surface 501 of the rotor core 31, and an inclined surface 841b which gradually inclines outward in the axial direction from the vertical surface 841a toward the outside in the radial direction and connects to the second refrigerant guide surface 832.

Accordingly, a part of the refrigerant flowing along the first refrigerant guide surface 831 hits the vertical surface 841a of the first step portion 841 and a part of the refrigerant hits the inclined surface 841b of the first step portion 841. The spreading direction of the refrigerant which hits the inclined surface 841b of the first step portion 841 to the outside in the axial direction changes depending on an inclination angle θ of the inclined surface 841b. Therefore, by adjusting the inclination angle θ of the inclined surface 841b, the spreading direction of the refrigerant to the outside in the axial direction can be adjusted. Accordingly, the refrigerant can be guided to a position of the first coil end portion 521 where cooling is desired, and thus the first coil end portion 521 can be cooled more efficiently.

Second Embodiment

Next, a rotary electric machine 10 according to a second embodiment of the present invention will be described with reference to FIGS. 7 and 8. In the following description, the same components as those of the rotary electric machine 10 of the first embodiment will be denoted by the same reference numerals, and the description thereof will be omitted or simplified. In the rotary electric machine 10 according to the first embodiment, the third refrigerant guide surface 833 extending radially to the outer peripheral surface of the refrigerant guide unit 80 is provided outside the second refrigerant guide surface 832 in the radial direction. However, the rotary electric machine 10 according to the second embodiment includes an outer peripheral wall portion 86 which protrudes in the axial direction along at least a part of the outer peripheral portion of the first coil end portion 521. Hereinafter, differences between the rotary electric machine 10 of the first embodiment and the rotary electric machine 10 of the second embodiment will be described in detail.

Figure 7:
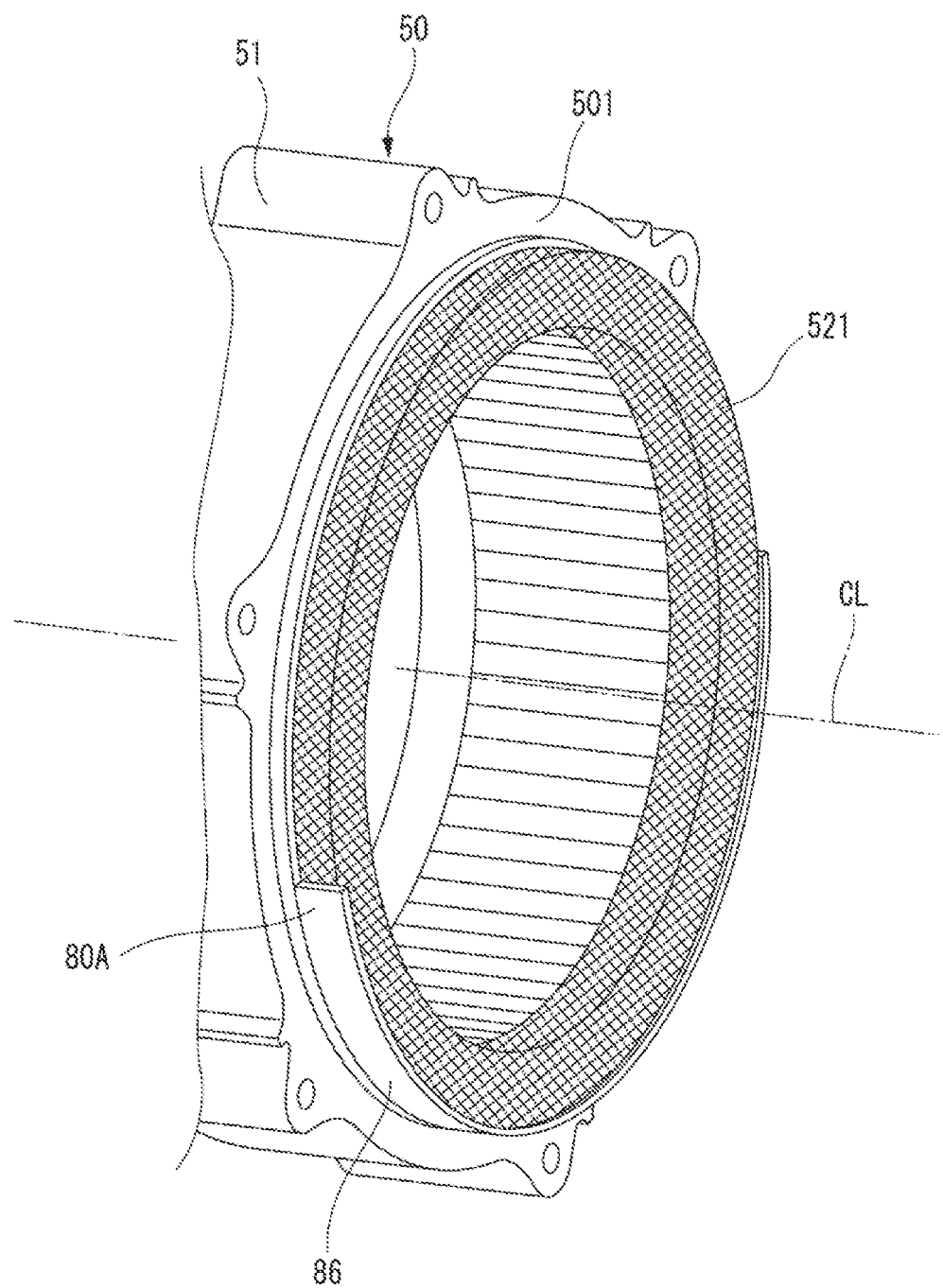
FIG. 7 is a perspective view of a stator of a rotary electric machine according to a second embodiment of the present invention in a state where a refrigerant guide unit is assembled.

As illustrated in FIG. 7, a refrigerant guide unit 80A includes the outer peripheral wall portion 86 which protrudes axially outward from the cuff ring portion 81 and is formed along a part of the outer peripheral portion of the first coil end portion 521. In the embodiment, when the rotary electric machine 10 is arranged such that the axial direction is parallel to a horizontal direction, the outer peripheral wall portion 86 is formed in a substantially circular arc shape along the outer peripheral portion of the first coil end portion 521 below around a horizontal line passing through the rotation axis CL of the rotary electric machine 10 or below the horizontal line when viewed from the axial direction.

Figure 8:
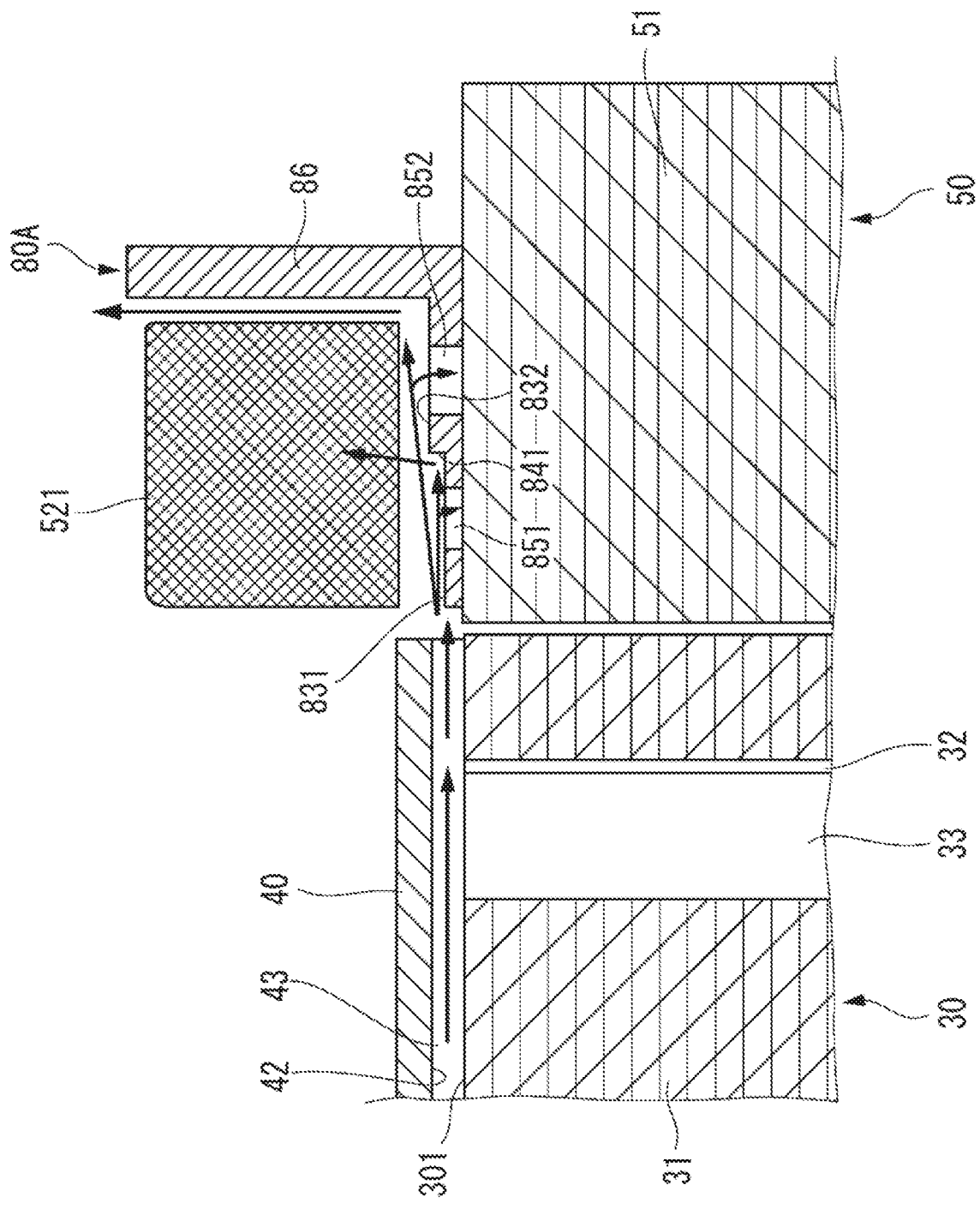
FIG. 8 is a partial cross-sectional view of the rotary electric machine according to the second embodiment of the present invention as viewed from a circumferential direction.

As illustrated in FIG. 8, below around the horizontal line passing through the rotation axis CL of the rotary electric machine 10, an axial outer end surface 83 of the refrigerant guide unit 80A includes a first refrigerant guide surface 831 extending radially outward from the inner peripheral surface of the refrigerant guide unit 80, and a second refrigerant guide surface 832 extending radially from the radial outside of the first refrigerant guide surface 831. Further, the outer peripheral wall portion 86 protruding outward in the axial direction is formed on the outer edge portion of the refrigerant guide unit 80A radially outside the second refrigerant guide surface 832. The outer peripheral wall portion 86 protrudes further on the axial outer side than the first coil end portion 521.

The second refrigerant guide surface 832 is formed outside the first refrigerant guide surface 831 in the axial direction. The first step portion 841 extending in the axial direction is formed between the first refrigerant guide surface 831 and the second refrigerant guide surface 832.

In the embodiment, the first refrigerant guide surface 831 and the second refrigerant guide surface 832 are formed such that the first step portion 841 is disposed substantially at the center of the cuff teeth portion 82 in the radial direction, and the second refrigerant guide surface 832 is formed such that the outer peripheral wall portion 86 is arranged in the cuff ring portion 81. Respective first step portions 841 formed in the cuff teeth portions 82 are formed so as to be substantially at the same position in the radial direction.

A part of the refrigerant discharged from the refrigerant supply passage 43 to the outside of the rotor 30 and the end plate 40 in the radial direction flows along the second refrigerant guide surface 832. A part of the refrigerant flowing along the second refrigerant guide surface 832 flows to the second through-hole 852 and a part thereof hits the outer peripheral wall portion 86 and flows outward along the outer peripheral wall portion 86 in the axial direction. Since the refrigerant can be supplied to the outer peripheral portion of the first coil end portion 521 by flowing outward along the outer peripheral wall portion 86 in the axial direction, the first coil end portion 521 can be cooled more efficiently.

Returning to FIG. 7, the refrigerant discharged radially outside the rotor 30 and the end plate 40, including the refrigerant discharged above the horizontal line passing through the rotation axis CL of the rotary electric machine 10, cools the first coil end portion 521 and then flows downward by gravity. The outer peripheral wall portion 86 is formed in a substantially circular arc shape along the outer peripheral portion of the first coil end portion 521 below around the horizontal line passing through the rotation axis CL of the rotary electric machine 10 or below the horizontal line when viewed from the axial direction. Therefore, the refrigerant after cooling the first coil end portion 521 can be retained in the substantially arc-shaped outer peripheral wall portion 86. Therefore, the first coil end portion 521 below around the horizontal line passing through the rotation axis CL of the rotary electric machine 10 in which the outer peripheral wall portion 86 is formed can be more efficiently cooled by the refrigerant retaining in the outer peripheral wall portion 86.

Several embodiments of the present invention are described above. However, the present invention is not limited to the embodiments described above, and modifications, improvements, and the like can be appropriately made.

For example, in the first and second embodiments, the refrigerant guide units 80 and 80A are disposed on the first end surface 501 in the axial direction of the stator core 51. However, it may be disposed on the second end surface 502 in the axial direction of the stator core 51 or may be disposed on both the first end surface 501 and the second end surface 502.

Also, for example, in the first embodiment, in the refrigerant guide unit 80, the first step portion 841 is arranged substantially at the center of the cuff teeth portion 82 in the radial direction and the second step portion 842 is arranged in the cuff ring portion 81. However, a plurality of first step portions 841 may be arranged in the radial direction of the cuff teeth portion 82 or both the first step portion 841 and the second step portion 842 may be arranged radially in the cuff teeth portion 82.

At least the following matters are described in this specification. Although components or the likes corresponding to those of the embodiments described above are shown in the parentheses, the present invention is not limited thereto.

(1) A rotary electric machine (rotary electric machine 10) includes:

a rotor (rotor 30) including a rotor core (rotor core 31) having a substantially annular shape;

an end plate (end plate 40) disposed on a first rotor core end surface (first end surface 301) on at least one end side of the rotor core in an axial direction; and a stator (stator 50) including a stator core (stator core 51) disposed at a predetermined gap from an outer peripheral surface of the rotor and a coil (coil 52) provided to the stator core, wherein the stator core includes:
a stator yoke portion (stator yoke portion 511) having a substantially annular shape;
a plurality of stator teeth portions (stator teeth portions 512) provided along a circumferential direction and protruding radially from an inner peripheral surface of the stator yoke portion toward a center; and
a plurality of slot portions (slot portions 513) formed between adjacent stator teeth portions, wherein the coil is inserted into each slot portion of the stator core and includes a coil end portion (first coil end portion 521) protruding in the axial direction from a first stator core end surface (first end surface 501) on the one end side of the stator core in the axial direction, wherein a refrigerant is discharged radially outward of the rotor, and wherein a refrigerant guide unit (refrigerant guide unit 80) configured to guide the refrigerant discharged radially outward of the rotor in a protruding direction of the coil end portion is disposed on the first stator core end surface.

According to (1), the refrigerant discharged radially outside the rotor can be guided from the first stator core end surface in the protruding direction of the coil end portion by the refrigerant guide unit disposed on the first stator core end surface. Therefore, the coil end portion can be cooled uniformly.

(2) In the rotary electric machine according to (1), the end plate includes a refrigerant flow groove (refrigerant flow groove 42) formed on a surface (axial inner end surface 40a) facing the rotor core and configured to guide the refrigerant to a radial outside of the end plate.

According to (2), the end plate includes the refrigerant flow groove formed on the surface facing the rotor core and configured to guide the refrigerant to the radial outside of the end plate. Therefore, the refrigerant can be more efficiently supplied to the radial outside of the rotor.

(3) In the rotary electric machine according to (1) or (2), the refrigerant guide unit includes:

a first refrigerant guide surface (first refrigerant guide surface 831) formed on an axial outer end surface (axial outer end surface 83);

a second refrigerant guide surface (second refrigerant guide surface 832) formed on the axial outer end surface radially outside the first refrigerant guide surface, wherein the second refrigerant guide surface is formed outside the first refrigerant guide surface in the axial direction; and a first step portion (first step portion 841) extending in the axial direction and formed between the first refrigerant guide surface and the second refrigerant guide surface.

According to (3), the refrigerant guide unit includes the first refrigerant guide surface, the second refrigerant guide surface formed radially outside the first refrigerant guide surface and axially outside the first refrigerant guide surface, and the step portion extending in the axial direction and formed between the first refrigerant guide surface and the second refrigerant guide surface. Therefore, the refrigerant discharged radially outward of the rotor and flowing through the first stator core end surface passes through the first refrigerant guide surface and hits the step portion, and then spreads axially outward. Accordingly, the refrigerant can be guided in the protruding direction of the coil end portion, and thus the coil end portion can be cooled uniformly.

(4) In the rotary electric machine according to (3), the first step portion includes an inclined surface (inclined surface 841b) gradually inclined outward in the axial direction toward the outside in a radial direction.

According to (4), the first step portion includes the inclined surface gradually inclined outward in the axial direction toward the outside in the radial direction. Therefore, the direction of spreading of the refrigerant to the outside in the axial direction can be adjusted, and thus the refrigerant can be guided to a position in the coil end portion where the refrigerant is desired to be cooled.

(5) In the rotary electric machine according to (3) or (4), the refrigerant guide unit further includes:

a third refrigerant guide surface (third refrigerant guide surface 833) formed on the axial outer end surface radially outside the second refrigerant guide surface, wherein the third refrigerant guide surface is formed outside the second refrigerant guide surface in the axial direction; and a second step portion (second step portion 842) extending in the axial direction and formed between the second refrigerant guide surface and the third refrigerant guide surface.

According to (5), since the refrigerant guide unit includes a plurality of step portions along the radial direction. Therefore, more refrigerant can be guided in the protruding direction of the coil end portion and the refrigerant can be diffused over a wider area of the coil end portion.

(6) In the rotary electric machine according to any one of (1) to (5), the refrigerant guide unit includes a through-hole (first through-hole 851, second through-hole 852) which penetrates in the axial direction and through which the first stator core end surface is exposed.

According to (6), the refrigerant guide unit includes the through-hole which penetrates in the axial direction and through which the first stator core end surface is exposed. Therefore, the stator core can be cooled directly by the refrigerant discharged radially outward of the rotor and flowing through the first stator core end surface.

(7) In the rotary electric machine according to any one of (1) to (6),
the refrigerant guide unit includes:
a cuff ring portion (cuff ring portion 81) having a substantially annular shape and disposed on the first stator core end surface of the stator yoke portion; and
a cuff teeth portion (cuff teeth portion 82) protruding radially from an inner peripheral surface of the cuff ring portion toward the center and disposed on the first stator core end surface of the stator teeth portion.

According to (7), the refrigerant guide unit includes the cuff teeth portion disposed on the first stator core end surface of the stator teeth portion. Therefore, the refrigerant discharged radially outward of the rotor and flowing through the first stator core end surface of the stator teeth portion can be guided in the protruding direction of the coil end portion.

(8) In the rotary electric machine according to (7),
the cuff teeth portion is formed such that a circumferential width is substantially equal to a circumferential width of the stator teeth portion.

According to (8), the cuff teeth portion is formed such that the circumferential width thereof is substantially equal to the circumferential width of the stator teeth portion. Therefore, the amount of circumferential bending of the coil at the coil end portion can be regulated and the coil can be prevented from coming in contact with the first stator core end surface. This prevents damage to the stator core and the coil.

(9) In the rotary electric machine according to (7) or (8),
the refrigerant guide unit further includes:
an outer peripheral wall portion (outer peripheral wall portion 86) protruding axially outward from the cuff ring portion and formed along at least a part of an outer peripheral portion of the coil end portion.

According to (9), the refrigerant guide unit includes the outer peripheral wall portion protruding in the axial direction from the cuff ring portion along at least a part of the outer peripheral portion of the coil end portion. Therefore, the refrigerant discharged radially outward of the rotor and reaching the outer peripheral wall portion can be supplied to the outer peripheral portion of the coil end portion, so that the coil end portion can be cooled more efficiently.

(10) In the rotary electric machine according to any one of (1) to (9),
the refrigerant guide unit is formed of an insulating material.

According to (10), since the refrigerant guide unit is formed by an insulating material, insulation between coils and the like can also be ensured.

The invention claimed is:

1. A rotary electric machine comprising:
a rotor including a rotor core having a substantially annular shape;
an end plate disposed on a first rotor core end surface on at least one end side of the rotor core in an axial direction; and
a stator including a stator core disposed at a predetermined gap from an outer peripheral surface of the rotor, and a coil provided to the stator core,
wherein the stator core includes:
a stator yoke portion having a substantially annular shape;
a plurality of stator teeth portions provided along a circumferential direction and protruding radially from an inner peripheral surface of the stator yoke portion toward a center; and
a plurality of slot portions formed between adjacent stator teeth portions,
wherein the coil inserted into each slot portion of the stator core and including a coil end portion protruding in the axial direction from a first stator core end surface on one end side of the stator core in the axial direction,
wherein a refrigerant is discharged radially outward of the rotor,
wherein a refrigerant guide unit configured to guide the refrigerant discharged radially outward of the rotor in a protruding direction of the coil end portion is disposed on the first stator core end surface, and
wherein the refrigerant guide unit includes a through-hole which penetrates in the axial direction and through which the first stator core end surface is exposed.

2. The rotary electric machine according to claim 1,
wherein the end plate includes a refrigerant flow groove formed on a surface facing the rotor core and configured to guide the refrigerant to a radial outside of the end plate.

3. The rotary electric machine according to claim 1,
wherein the refrigerant guide unit is formed of an insulating material.

4. The rotary electric machine according to claim 1,
wherein the refrigerant guide unit includes:
a first refrigerant guide surface formed on an axial outer end surface;
a second refrigerant guide surface formed on the axial outer end surface radially outside the first refrigerant guide surface, wherein the second refrigerant guide surface is formed outside the first refrigerant guide surface in the axial direction; and
a first step portion extending in the axial direction and formed between the first refrigerant guide surface and the second refrigerant guide surface.

5. The rotary electric machine according to claim 4,
wherein the first step portion includes an inclined surface gradually inclined outward in the axial direction toward an outside in a radial direction.

6. The rotary electric machine according to claim 4,
wherein the refrigerant guide unit further includes:
a third refrigerant guide surface formed on the axial outer end surface radially outside the second refrigerant guide surface, wherein the third refrigerant guide surface is formed outside the second refrigerant guide surface in the axial direction; and
a second step portion extending in the axial direction and formed between the second refrigerant guide surface and the third refrigerant guide surface.

7. The rotary electric machine according to claim 1,
wherein the refrigerant guide unit includes:
a cuff ring portion having a substantially annular shape and disposed on the first stator core end surface of the stator yoke portion; and
a cuff teeth portion protruding radially from an inner peripheral surface of the cuff ring portion toward the center and disposed on the first stator core end surface of the stator teeth portion.

8. The rotary electric machine according to claim 7,
wherein the cuff teeth portion is formed such that a circumferential width is substantially equal to a circumferential width of the stator teeth portion.

9. The rotary electric machine according to claim 7,
wherein the refrigerant guide unit further includes:

an outer peripheral wall portion protruding axially outward from the cuff ring portion and formed along at least a part of an outer peripheral portion of the coil end portion.

\* \* \* \* \*